3,159,529
PAPER PRODUCTS CONTAINING A SULFONATED 2-PHENOXYETHYL ACRYLATE POLYMER

George W. Buttrick, Charleston, and Nelson R. Eldred, South Charleston, W. Va., assignors to Union Carbide Corporation, a corporation of New York
No Drawing. Filed July 6, 1962, Ser. No. 208,114
14 Claims. (Cl. 162—168)

The present invention relates to the production of paper products from conventional cellulosic papermaking fibers. More particularly, the invention is concerned with the incorporation in such paper products of certain high molecular weight polymers whereby the physical properties of the paper products are materially improved. Specifically, this invention depends upon the finding that paper products evidencing a higher degree of dry- and wet-strength, improved filler retention, and other desirable physical properties, are obtained by applying to the paper pulp or paper, at some time during the production of the paper, up to and including the finished paper, an aqueous medium containing a substantially water-soluble polymer of 2-sulfophenoxyethyl acrylate. The invention further comprehends the improved paper products produced in this manner.

It is known that conventional cellulosic paper products, particularly when wetted, ordinarily lose their strength rapidly, and are, for instance, easily torn. To improve the physical properties of paper in this regard, it has become common practice to treat the paper with a water-soluble resin, such as a urea- or melamine-formaldehyde resin, that can subsequently be acid-cured to insolubilize the resin. While some improvement in the strength of the paper can be realized in this manner, the use of urea- or melamine-formaldehyde resins is not entirely satisfactory in that accelerated heat-curing, or ageing at room temperature for prolonged periods of time in the presence of an acidic curing agent is ordinarily required in connection therewith in order to develop a high degree of strength in the paper. Moreover, the strength developed through the use of urea- and melamine-formaldehyde resins is frequently temporary or lost after exposure to water. This latter phenomenon, it is believed, is due at least in part to the fact that the acid-cured resin is readily hydrolyzed, especially in the presence of acidic materials such as the acidic curing agents which normally remain in the resin. In addition, paper treated with urea- or melamine-formaldehyde resins often develops a hard "hand" or feeling, or does not have the desired dimensional stability, fold endurance, tear strength or bursting strength desired for certain applications.

Many similar disadvantages are also encountered when other conventional agents, such as glue and starch sizes, are applied in an attempt to improve the physical properties of paper products. Furthermore, such compounds also require extensive cooking in water to effect their solution prior to use, and necessitate the additional incorporation of a preservative in order to minimize their bacterial degradation.

Another serious difficulty encountered in the production of paper concerns pigment retention. In conventional systems, at a single pass, only about 30 percent by weight of the pigment or filler added to the papermaking furnish is retained in the final sheet. When the water and other materials which drain through the forming screen or wire at the time the sheet is formed are recirculated (a closed system), it is possible to retain up to 70 to 90 percent by weight of the pigment added to the furnish, particularly when a low concentration of pigment based upon the weight of paper (fibers) is employed. Pigment retention, however, provides a more difficult problem when 15 to 20 percent by weight or more of the pigment based upon the weight of paper is to be retained in the finished sheet. Under such circumstances, it is necessary to recirculate and carry a large quantity of suspended pigment in the system. However, such large quantity of suspended pigment often interferes with satisfactory paper formation causing streaks in the finished paper, and upon discharge into the waste stream may cause pollution as well as engender an uneconomical operation.

It has now been found that the disadvantages of the prior art as hereinabove described can be overcome to a significant extent through the practice of the present invention which, in important part, comprises applying to the paper pulp in the "wet-end" stage or to the finished paper an aqueous medium containing an anionic high-molecular weight, normally solid and substantially water-soluble polymer containing polymerized 2-sulfophenoxyethyl acrylate, including homopolymers thereof as well as interpolymers thereof (i.e., copolymer, terpolymers, quadripolymers, etc.), with at least one other copolymerizable monomer, such as 2-phenoxyethyl acrylate, the alkyl acrylates in which the alkyl moiety contains from 1 to about 8 carbon atoms, such as methyl acrylate, ethyl acrylate and 2-ethylhexyl acrylate, etc., acrylamide, and the like, the amount of polymerized 2-sulfophenoxyethyl acrylate

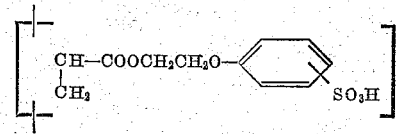

in the interpolymers being sufficient to assure the substantial and preferably complete water solubility of the interpolymers. Found to be particularly effective in this regard are the polymers consisting essentially of polymerized 2-phenoxyethyl acrylate and ethyl acrylate units, preferably in a proportion of from about 20 to about 80 percent by weight of each, the total amount thereof being 100 percent, and in which at least about 25 percent, and more preferably at least about 50 percent, of the total number of polymerized 2-phenoxyethyl acrylate units are present in the form of the ring-substituted sulfo derivative (i.e., polymerized 2-sulfophenoxyethyl acrylate units), the remainder thereof being unsubstituted. Thus the preferred polymers contemplated by this invention as a treating agent for paper products include both copolymers of 2-sulfophenoxyethyl acrylate and ethyl acrylate, as well as terpolymers thereof with unsubstituted 2-phenoxyethyl acrylate.

Advantageously, upon drying at room temperature, or preferably at a moderately elevated temperature for a short period of time, the treated paper products of this invention evidence a high, and substantially permanent degree of dry- and wet-strength, and in this respect, as well as in other physical properties, are often superior to many commercial paper products. Moreover, accelerated heat-curing or ageing for prolonged periods of time, as is ordinarily required in connection with the use of cationic urea- and melamine-formaldehyde resins, is not necessary to develop a satisfactory degree of dry- and wet-strength in the improved paper products of this invention. In addition, unlike urea- and melamine-formaldehyde resin-treated papers which require heat-curing or ageing in an acidic environment to develop strength, the improved paper products of this invention can be prepared in the absence of a curing agent, and in certain instances in a neutral or somewhat alkaline environment, if desired. Still another advantage of this invention lies in the fact that the polymers employed as treating agents in accordance with this invention have been found more effective at lower concentrations insofar as an improvement in dry- and wet-strength is concerned, as compared with many conventional treating agents. Thus, this invention also provides a more convenient and economical process for the production of improved paper products.

The polymers contemplated by this invention as a treating agent for paper products can be obtained by various methods, as for instance, by the initial formation of a normally water insoluble homopolymer of 2-phenoxyethyl acrylate or interpolymer thereof with ethyl acrylate and/or other copolymerizable monomers, followed by sulfonation so as to convert the desired number of polymerized unsubstituted 2-phenoxyethyl acrylate units to the corresponding ring-substituted sulfo derivative, i.e., to render the polymer product substantially, and preferably completely, water soluble.

The homopolymers of 2-phenoxyethyl acrylate and interpolymers thereof with other copolymerizable monomers, such as ethyl acrylate, etc., are readily produced at temperatures of from about 20° C. to about 75° C. or somewhat higher by any of the conventional polymerization processes. Thus bulk polymerization can be employed in which the monomer(s) are mixed together with the catalyst and reacted at a temperature at which polymerization will occur. Emulsion and suspension polymerization processes can also be employed. These processes, as is known, are carried out in aqueous medium, and generally employ free radical type catalysts and emulsifying or dispersing agents. Solution polymerization techniques can also be used, in which case the monomers are dissolved in a suitable solvent and polymerized in contact with a catalyst. Illustrative solvents are, for example, acetone, acetonitrile, N,N-dimethylformamide, N,N,-dimethylacetamide, dimethyl sulfoxide, and the like. Illustrative catalysts are the azo type catalysts as disclosed in United States Patent No. 2,471,959; the peroxide such as hydrogen peroxide, lauroyl peroxide, dipropionyl peroxide, butyryl peroxide, benzoyl peroxide, acetyl peroxide, peracetic acid, ditertiary butyl peroxide, tertiary butyl hydroperoxide, hydroxyheptyl peroxide, acetyl benzoyl peroxide, diethyl peroxide, succinic peroxide, urea peroxide, tetralin peroxide, and so forth; the alkali metal persulfates, perborates, and percarbonates; the ammonium persulfates, perborates, and percarbonates; diisopropylperoxydicarbonate; and the like.

The sulfonation of the polymer thus obtained to provide the polymeric treating agents of this invention can thereafter be carried out, by way of illustration, using a sulfuric acid and acetic anhydride sulfonation medium. In one embodiment, the polymer is dissolved in an inert solvent, for example, acetonitrile, acetone, N,N-dimethylformamide, or the like, and a sulfonation mixture of at least equimolar amounts of sulfuric acid and acetic anhydride in a solvent is added to the polymer solution. The reaction mixture is stirred until the desired degree of sulfonation has been obtained and the sulfonated polymer is then recovered from the reaction mixture. In an alternative method the polymer is dissolved in an inert solvent, together with the acetic anhydride, and the sulfuric acid is added to the solution at an amount not exceeding the molar amount of acetic anhydride present in the mixture. The molar ratio of sulfuric acid to acetic anhydride is a critical variable for the proper operation of the process, and the molar amount of sulfuric acid should in all cases be either equal to or less than the molar amount of acetic anhydride present. In addition, the amount of sulfuric acid present should be sufficient to convert the desired number of polymerized 2-phenoxyethyl acrylate units to polymerized 2-sulfophenoxyethyl acrylate units so as to render the polymer substantially and preferably completely, water soluble. This amount can readily be determined by one skilled in the art in light of this disclosure.

The sulfonation is carried at temperatures of from about −10° C. to about 25° C. and can be controlled so that the conversion of polymerized 2-phenoxyethyl acrylate units to polymerized 2-sulfophenoxyethyl acrylate units can be essentially quantitative. Preferably, the sulfonation is carried out at from about 5° C. to about 20° C.

If desired, the polymerization and sulfonation can be carried out in a continuous manner. Moreover, while the para-sulfo derivatives are most readily produced, other sulfonated derivatives, e.g., the ortho-derivatives, are also often formed, or can be obtained by varying the sulfonation reaction in a manner determinable by those skilled in the art in light of this disclosure.

The sulfonated polymer can be recovered at the completion of the sulfonation reaction by coagulation, or by partial or complete neutralization with suitable basic materials such as the alkali metal chlorides and hydroxides, e.g., the chlorides and hydroxides of sodium and potassium, or the corresponding ammonium compounds, etc., quaternary ammonium salts such as triethyl-2-hydroxyethylammonium carbonate, saturated aliphatic amines such as triethylamine and bis(2-cyanoethyl)amine, and the like, followed by the recovery of the partially or completely neutralized polymer in any convenient manner. It is to be noted that the partially or completely neutralized polymers are also effective as treating agents for paper products in accordance with this invention, although their solubility in water decreases as complete neutralization is approached. Hence, the polymers contemplated by this invention as treating agents for paper products also include the substantially, and preferably completely, water soluble neutralized polymers obtained as described above.

The aqueous polymer solutions employed to treat paper in accordance with this invention can be prepared in any convenient manner. The amount of water present can vary broadly, but is preferably sufficient to provide solutions containing from about 5 to about 10 weight percent of the polymeric treating agent, particularly when the treating solution is employed as a "tub-size." However, more dilute or more concentrated solutions can also be employed to treat paper in accordance with this invention. Moreover, the polymeric treating agents of this invention may also be introduced in solid form to the aqueous media conventionally encountered in connection with the manufacture of paper.

Advantageously, the polymeric treating agents of this invention can be employed effectively in a basic, neutral, or acidic environment or medium, with use in an acidic media affording better results measurable in terms of both the strength of the resulting treated paper products and the temperature and time required to cure the paper in order to develop maximum strength. Thus, while the pH can vary, generally, from about 1 to about 10, particularly good results have been obtained, especially in connection with the use of the polymeric treating agents in the "wet-end" stage, using media having a pH of from about 4 to about 6, the more acidic media being somewhat less desirable for use in conventional papermaking equipment. The pH can be adjusted to within the desired range, when desired, by the suitable addition of acidic or basic compounds to the medium.

In producing the paper products of this invention, the polymeric treating agents can be employed at either the "wet-end" stage by introducing the polymers to the aqueous papermaking furnish at any time prior to sheet formation, or applied as a "tub-size" to sheeted paper. The resulting paper product incorporating one or more of the polymers is then dried, preferably at a moderately elevated temperature for a short period of time. To this end, a period of from about 3 to about 10 minutes at a temperature in the range of from about 75° C. to about 150° C. affords particularly good results. Drying at higher temperatures or for longer periods of time can, of course, also be effected, although little additional advantage may thereby be realized insofar as the strength of the paper is concerned. Satisfactory strength is also developed by drying at room temperature for periods of up to about 24 hours or less. The actual time and temperature required to dry the treated paper will depend, for example, upon the amount of polymer and/or solution contained by the paper. Under any circumstance, good results advantageously can be obtained by drying the treated paper at the temperatures and for the periods of time employed in accordance with the conventional manufacture of paper products.

When employing the polymeric treating agents of this invention at the "wet-end" stage, one or more of the polymers, preferably in aqueous solution, is added to the paper furnish at any suitable time prior to sheeting. For example, the adduct can be introduced prior to, during, or after beating. Thus, the adduct can be added in the beater, in the jordan, in the fan pump, or in the headbox, etc. A proportion of from about 0.5 to about 10 weight percent or more of the polymer based upon the weight of the paper fibers has been found to afford good results, with a proportion of from about 1 to about 3 weight percent of the polymer based upon the weight of the paper fibers being preferred. Higher proportions of polymer can also be employed, although little additional advantage may thereby be realized insofar as the strength of the paper is concerned.

Since the polymeric treating agents of this invention are anionic, i.e., possess a negative charge in solution, it is also preferred, if not essential, to incorporate a cationic retention agent, particularly at the "wet-end" stage, in order to increase the substantivity of the polymer to the paper fibers. The incorporation of the cationic retention agent may, by appropriate selection, also assist in adjusting the pH of the environment to within the desired range. Suitable conventional cationic retention agents include, for example, polyvalent metal salts such as papermakers' alum, etc., cationic starch, cationic melamine-formaldehyde resins, and the like, of which papermakers' alum is preferably employed. Such retention agents, when employed, are ordinarily incorporated in a concentration of from about 0.5 to about 10 weight percent based upon the weight of the paper fibers and preferably from about 1 to about 3 weight percent based upon the weight of the paper fibers.

A conventional filler or pigment can also be employed at the "wet-end" stage, and when present, advantageously is retained to an enhanced extent due to the use of the polymeric treating agents of this invention. Suitable fillers include, for instance, clay, calcium carbonate, titanium dioxide, talc, calcium silicate, barium sulfate, and the like. Such fillers can be employed in a proportion of from about 2 to about 40 weight percent based upon the weight of the paper fibers.

Thereafter, the treated paper fibers can be sheeted and dried as indicated above to produce the improved paper products of this invention. Operations associated with conventional paper manufacture, it is to be noted, are well suited for use in this regard.

When employing the polymeric treating agents of this invention as a "tub-size," sheeted paper is dipped, rolled, or padded with an aqueous solution of one or more of the polymers. The pH of the treating solution is subject to the same considerations described above with respect to pH, as is the proportion of polymer to paper. The latter can be controlled, for instance, by adjusting the amount of solution applied to or picked up by the paper, by adjusting the concentration of polymer in the treating solution, or both, as is readily determined by one skilled in the art in light of this disclosure. The paper product is then dried as hereinabove described.

Any suitable pulp can be used in forming the improved paper products of this invention, including bleached and unbleached pulp. Suitable pulp includes sulfite, kraft, soda, groundwood, rag, rope, and jute pulp, etc. The pulp can also contain a minor amount of conventional, synthetic paper-making fibers. Moreover, when it is desired to treat finished paper in accordance with this invention, the paper can be formed in any conventional manner, such as with a Fourdrinier or a cylinder machine.

The improved paper products of this invention can subsequently be employed as packaging, paper bags, bond and envelope papers, paper board, or wherever paper having a high degree of dry- and/or wet-strength finds suitable application.

The invention can be illustrated further by the following specific examples of its practice, although the invention is not to be construed as limited by the examples. In connection therewith, and with the remainder of the specification and claims, the following definitions are made.

By the term "reduced viscosity" as employed herein is meant the value obtained by dividing the specific viscosity of a polymer solution by the concentration of the polymer in the solution, the concentration being calculated in grams of polymer per 100 milliliters of solvent at a given temperature. The specific viscosity of the polymer solution is obtained by dividing the difference between the viscosity of the polymer solution and the viscosity of the solvent by the viscosity of the solvent. The reduced viscosity of a polymer is taken as a measure of the molecular weight of the polymer in that a higher reduced viscosity indicates a higher molecular weight polymer. Conversely a lower reduced viscosity indicates a lower molecular weight polymer. In all cases, the reduced viscosity values set forth herein are determined at a concentration of 0.2 gram of polymer per 100 milliliters of solvent and at a temperature of 30° C., using dimethylformamide as the solvent. Thus measured, the reduced viscosity of the polymeric treating agents of this invention is ordinarily at least 0.1, and is preferably in the range of from about 1 to about 25.

The terms "basis weight," "ream," "tensile strength," "dry strength," "wet strength," and "bursting strength" are well known in the paper art, and are employed herein in accordance with conventional meanings, a brief description of which is given below.

The common unit for expressing the weight of paper is the number of pounds of paper per ream. Basis weight is the term used in the paper art to refer to the weight in pounds of a ream containing a certain number of sheets cut to a given size. Basis weights mentioned herein are in terms of a standard ream containing 500 sheets, each sheet being 25 x 40 inches. From the weight of any given area of paper, the basis weight is readily calculated.

Tensile strengths, both wet and dry, were measured on a table model Instron tensile tester. In this connection, tensile strength is defined as the force required to break a strip of paper having a standard width of 15 millimeters. Dry- and wet tensile strengths are reported in kilograms/15 millimeters. Percent wet tensile strength refers to that percentage of the dry tensile strength which is retained upon wetting the sheet, and is obtained by dividing the wet tensile strength by the dry tensile strength and multiplying by one hundred. The initial wet tensile strength is determined immediately after wetting the specimen with water; the "16-hour" wet tensile strength is determined after soaking the specimen in water at a temperature of 23° C. for a period of 16 hours.

Bursting strength is an empirical test, and is defined as the hydrostatic pressure required to rupture paper when deformed in an approximate sphere 1.20 inches in diameter at a controlled rate of loading. A B. F. Perkins Model C Mullen bursting strength tester was used to measure the bursting strength of the paper products of this invention. Bursting strengths are reported as points per 100 lbs. This number is obtained by dividing the bursting strength recorded on the pressure gauge of the tester in pounds per square inch by the basis weight of the paper, and multiplying by one hundred.

EXAMPLE I

To prepare polymeric treating agents of this invention, a series of experiments was conducted, identified below as runs A to G, in which copolymers of 2-phenoxyethyl acrylate with ethyl acrylate were initially produced. The polymerization charge employed in each run is indicated below in Table A, with the proportions of polymerized monomers present in the copolymers being approximately equal to the proportions charged. The amounts are set forth in grams.

*Table A*

| Materials Charged | Run Nos. | | | | | | |
|---|---|---|---|---|---|---|---|
| | A | B | C | D | E | F | G |
| 2-Phenoxyethyl acrylate | 32 | 8 | 16 | 24 | 24 | 24 | 24 |
| Ethyl acrylate | 8 | 32 | 24 | 16 | 16 | 16 | 16 |
| Acetonitrile | 60 | 60 | 60 | 60 | 60 | 60 | 60 |
| Azobisisobutyronitrile | 0.4 | 0.4 | 0.4 | 0.4 | 0.4 | 0.4 | 0.4 |

The polymerizations were carried out as follows. In each run, the polymerization charge was introduced into a Pyrex bottle and purged with nitrogen. Each bottle was capped, tumbled in a 50° C. bath for a period of about 24 hours, and cooled to about room temperature. In this manner, a solution of a copolymer of 2-phenoxyethyl acrylate with ethyl acrylate was produced in each run.

With the temperature of the reaction mixture maintained below 10° C., a solution consisting of sulfuric acid, acetic anhydride, and acetonitrile was added to the reaction mixture in each of the above bottles. This solution was prepared in a batch amount for each of the runs by the slow addition of 78 grams of sulfuric acid to a mixture of 121 grams of acetic anhydride and 200 grams of acetonitrile, with stirring, at a temperature of about 5° C. Additional acetonitrile was then added to each bottle in an amount sufficient to reduce the concentration of the resulting solution to approximately 20 percent by weight polymer, exclusive of contained sulfuric acid. Each bottle, while cooled as indicated above, was shaken until homogeneous and allowed to stand in a wet ice bath for two hours. Thereafter, each bottle was removed from the bath and warmed to slightly above 10° C. Water was then added to each bottle to quench the sulfonation, followed by the precipitation of the resulting sulfonated polymer. The amounts charged are indicated below in Table B. In the table, it is to be noted, the amounts indicated are those added to the 2-phenoxyethyl acrylate/ethyl acrylate copolymer solution initially obtained as described above. The designation "SAA solution" refers to the batch solution of sulfuric acid, acetic anhydride, and acetonitrile obtained as described above. The "total H₂SO₄" added to each bottle is indicated in terms of the amount of sulfur contained therein. Each of the amounts relating to the charge is set forth in grams. Also tabulated for each run is the degree of sulfonation achieved in each run, that is to say the percentage of unsubstituted 2-phenoxyethyl acrylate units in the initial copolymer which were sulfonated to the corresponding ring-substituted derivative (i.e., 2-sulfophenoxyethyl acrylate units), based upon essentially complete conversions.

*Table B*

| Materials Charged | Run Nos. | | | | | | |
|---|---|---|---|---|---|---|---|
| | A | B | C | D | E | F | G |
| SAA Solution | 84 | 21 | 42 | 63 | 47 | 31.4 | 15.7 |
| Acetonitrile | 9 | 77 | 54 | 31 | 48 | 66 | 83 |
| Water | 7 | 2 | 4 | 6 | 5 | 3 | 2 |
| Total H₂SO₄ | 16.3 | 4.1 | 8.1 | 12.2 | 9.2 | 6.1 | 3.06 |
| Degree of Sulfonation | 100 | 100 | 100 | 100 | 75 | 50 | 25 |

The polymer products of each run, identified as Polymers A to G, were employed in the examples described below.

EXAMPLE II

A series of solutions was prepared each containing 25 grams of a polymer treating agent of this invention produced as described in Example I, and 475 grams of water. Samples of a commercially available filled printing paper were then saturated independently in each of the polymer solutions, passed through squeeze rolls, and dried for a period of 10 minutes at a temperature of 110° C. After conditioning for a period of 24 hours at a temperature of 73° F. and 50 percent relative humidity, the physical properties of the treated papers were determined, the results of which are set forth below in Table C. Experiments were also conducted, in one instance using only water as the treating solution (control), and in another instance using a treating solution containing 5 weight percent of commercially available hypochlorite-oxidized starch dissolved in water.

In the table, the add-on is the amount of polymer or starch picked up by the paper and is indicated in weight percent based upon the weight of the paper fibers (dry weight). The percent increase in the physical properties evaluated are based upon comparison with the control.

*Table C*

| Treating Agent | Add-On | Dry Tensile Strength | Percent Increase | Bursting Strength | Percent Increase |
|---|---|---|---|---|---|
| Polymer A | 10 | 9.0 | 120 | 45 | 82 |
| Polymer B | 8 | 6.5 | 59 | 36 | 46 |
| Polymer C | 8 | 8.3 | 102 | 44 | 77 |
| Polymer D | 8 | 9.2 | 124 | 45 | 79 |
| Polymer E | 8 | 8.7 | 112 | 45 | 82 |
| Polymer F | 8 | 7.3 | 78 | 38 | 52 |
| Polymer G | 8 | 5.6 | 37 | 33 | 31 |
| Starch | 4 | 6.8 | 66 | 45 | 80 |
| Control | | 4.1 | | 25 | |

From the above data it can be seen that, when applied as solutions of equivalent concentration, the polymeric treating agents of this invention evidence twice the add-on as that obtained using commercially available starch as the treating agent. At the same time, the tensile strength of the paper products produced in accordance with this invention is much higher than that of the starch-treated paper, while the bursting strength is substantially improved over that of untreated paper.

A similar series of experiments was conducted using 2 percent aqueous treating solutions (i.e., 2 grams of polymer per 98 grams of water), the results of which are tabulated below in Table D.

*Table D*

| Treating Agent | Add-On | Dry Tensile Strength | Percent Increase |
|---|---|---|---|
| Polymer A | 2.2 | 6.6 | 61 |
| Polymer C | 2.5 | 6.1 | 49 |
| Polymer D | 2.2 | 6.2 | 51 |
| Polymer E | 2.2 | 6.5 | 59 |
| Control | | 4.1 | |

EXAMPLE III

In this series of experiments, 400 grams of air-dried unbleached kraft pulp which had initially been soaked in water for a period of four hours, was beaten at a consistency of 1.7 percent (concentration of pulp in water) to a Canadian standard freeness of 580 cc. Two-quart aliquots of the beaten pulp containing 30 grams of pulp fibers were thereafter admixed with a 5 percent aqueous solution of a polymeric treating agent of this invention in an amount sufficient to provide 3 percent by weight of the polymer based upon the weight of the pulp fibers; the pH was adjusted to 4.5 by the addition of papermakers alum. Handsheets were prepared therefrom and dried for a period of 15 minutes at a temperature of 150° C. except where otherwise indicated. After conditioning the treated papers in the manner described in Example II, the physical properties of the treated papers were determined, the results of which are set forth below in Tables E and F. A control experiment was also conducted omitting the use of a treating agent.

Table E

| Treating Agent | Dry Tensile Strength | Percent Increase | Wet Tensile Strength | Percent Wet Tensile | Bursting Strength | Percent Increase |
|---|---|---|---|---|---|---|
| Polymer A | 7.1 | 16 | 0.66 | 9 | 95 | 14 |
| Polymer A [1] | 6.8 | 11 | 0.40 | 6 | 90 | 8 |
| Control | 6.1 | | 0.35 | 6 | 83 | |

[1] Handsheets were dried for a period of 3 minutes at a temperature of 210° F.

Table F

| Treating Agent | Dry Tensile Strength | Wet Tensile Strength | Percent Wet Tensile |
|---|---|---|---|
| Polymer B | 6.1 | 1.2 | 20 |
| Polymer C | 6.0 | 0.62 | 10 |
| Polymer D | 6.2 | 0.67 | 11 |
| Polymer E | 5.5 | 0.60 | 11 |
| Polymer F | 6.0 | 0.66 | 11 |
| Polymer G | 5.9 | 0.64 | 11 |

In similar experiments, the polymers of this invention are about equally effective in improving the dry tensile strength of paper products produced from unbleached sulfite pulp and from bleached kraft and sulfite pulp. Thus another advantage of this invention is illustrated in the generally universal applicability thereof to various types of paper pulp.

EXAMPLE IV

In this series of experiments, 400 grams of bleached sulfite pulp was initially beaten as described above in Example III. Two-quart aliquots of the beaten pulp containing 30 grams of pulp fibers were thereafter admixed with 6 grams of filler and with a 5 percent aqueous solution of a polymeric treating agent of this invention in an amount sufficient to provide 1 percent by weight of the polymer based upon the weight of the pulp fibers; the pH was adjusted to 4.5 by the addition of papermakers' alum. Handsheets were prepared therefrom as described above in Example III. The amount of filler retained by the treated papers was determined by ash analysis, and the results obtained tabulated below in Table G. Control experiments were also conducted in which no treating agents were employed.

Table G

| Treating Agent | Filler | Percent Retention | Percent Increase |
|---|---|---|---|
| Polymer A | Clay | 36 | 175 |
| Control | Clay | 14 | |
| Polymer B | CaCO₃ | 52 | 300 |
| Control | CaCO₃ | 13 | |

From the above data tabulated above, the substantial improvement in filler retention achieved through the practice of this invention is readily apparent. In similar manner, improved paper products are obtained employing as the treating agent of this invention the polymers obtained in accordance with Example I upon substituting an approximately equimolar amount of 2-ethylhexyl acrylate for ethyl acrylate.

What is claimed is:

1. A paper product comprised of cellulosic papermaking fibers and including from about 0.5 to about 10 percent based upon said fibers of a normally solid water soluble polymer consisting essentially of polymerized 2-phenoxyethyl acrylate units and units of a copolymerizable monomer selected from the group consisting of acrylamide units and alkyl acrylate units, and alkyl moiety thereof containing from 1 to 8 carbon atoms, wherein a sufficient number of polymerized 2-phenoxyethyl acrylate units of said polymer are present as the ring-substituted sulfo derivative of the formula

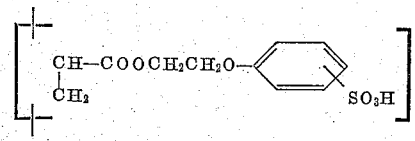

so as to render said polymer water soluble.

2. A paper product comprised of cellulosic papermaking fibers and including from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 25 percent of the total number of polymerized 2-phenoxyethyl acrylate units of said polymer are present as the ring-substituted sulfo derivative of the formula

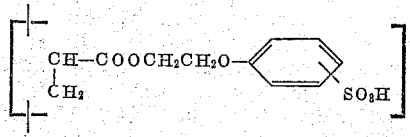

3. A paper product comprised of cellulosic papermaking fibers and including from about 1 to about 3 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 25 percent of the total number of polymerized 2-phenoxyethyl acrylate units of said polymer are present as the ring-substituted sulfo derivative of the formula

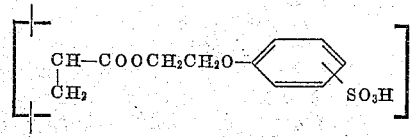

4. A paper product comprised of cellulosic papermaking fibers and including from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 50 percent of the total number of polymerized 2-phenoxyethyl acrylate units of said polymer are present as the ring-substituted sulfo derivative of the formula

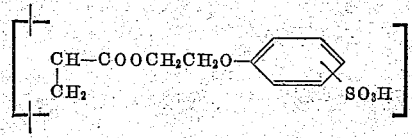

5. A paper product comprised of cellulosic papermaking fibers and including from about 1 to about 3 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 50 percent of the total number of polymerized 2-phenoxyethyl acrylate units of said polymer are present as the ring-substituted sulfo derivative of the formula

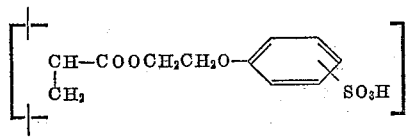

6. In the manufacture of paper products from cellulosic papermaking fibers, the improvement which comprises applying to said fibers in aqueous solution from about 0.5 to about 10 percent based upon said fibers of a normally solid, water soluble polymer consisting essentially of polymerized 2-phenoxyethyl acrylate units and units of a copolymerizable monomer selected from the group consisting of acrylamide units and alkyl acrylate units, the alkyl moiety thereof containing from 1 to 8 carbon atoms, wherein a sufficient number of polymerized 2-phenoxyethyl acrylate units of said polymer are present as the ring-substituted sulfo derivative of the formula

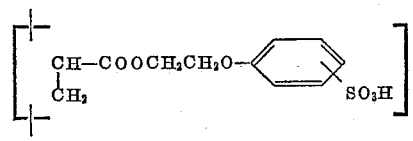

so as to render said polymer water soluble.

7. In the manufacture of paper products from cellulosic papermaking fibers, the improvement which comprises applying to said fibers in aqueous solution from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 25 percent of the total number of polymerized 2-phenoxyethyl acrylate units of said polymer are present as the ring-substituted sulfo derivative of the formula

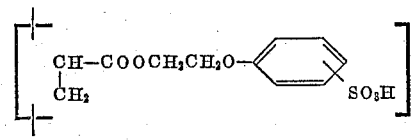

8. In the manufacture of paper products from cellulosic papermaking fibers, the improvement which comprises applying to said fibers in aqueous solution from about 1 to about 3 percent by weight based upon said fibers of a normally, water soluble polymer consisting essentially of polymerized 2-phenoxyethyl acrylate and ethyl acrylate units in a proportion of from about 20 to about 80 percent by weight of each, and wherein at least about 25 percent of the total number of polymerized 2-phenoxyethyl acrylate units of said polymer are present as the ring-substituted sulfo derivative of the formula

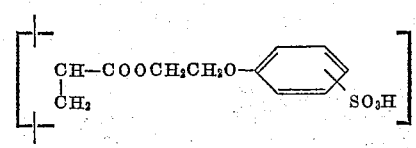

9. In the manufacture of paper products from cellulosic papermaking fibers, the improvement which comprises applying to said fibers in aqueous solution from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 50 percent of the total number of polymerized 2-phenoxyethyl acrylate units of said polymer are present as the ring-substituted sulfo derivative of the formula

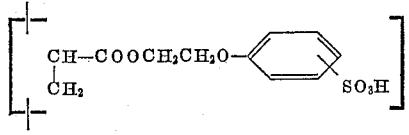

10. In the manufacture of paper products from cellulosic papermaking fibers, the improvement which comprises applying to said fibers in aqueous solution from about 1 to about 3 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 50 percent of the total number of polymerized 2-phenoxyethyl acrylate units of said polymer are present at the ring-substituted sulfo derivative of the formula

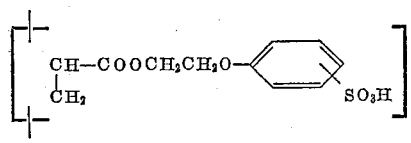

11. In the manufacture of paper products from cellulosic papermaking fibers, the improvement which comprises admixing said fibers with an aqueous medium containing from about 2 to about 40 percent by weight based upon said paper fibers of a paper filler and from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 25 percent of the total number of polymerized 2-phenoxyethyl acrylate units of said polymer are present as the ring-substituted sulfo derivative of the formula

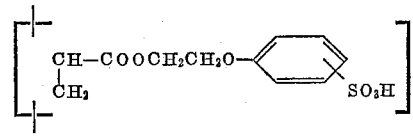

12. In the manufacture of paper products from cellulosic papermaking fibers, the improvement which comprises admixing said fibers with an aqueous medium containing from about 2 to about 40 percent by weight based upon said paper fibers of a paper filler and from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 50 percent of the total number of polymerized 2-phenoxyethyl acrylate units of said polymer are present as the ring-substituted sulfo derivative of the formula

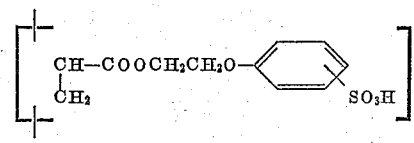

13. A paper product comprised of cellulosic papermaking fibers and including from about 2 to about 40 percent by weight based upon said fibers of a paper filler and from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 25 percent of the total number of polymerized 2-phenoxyethyl acrylate units of said polymer are present as the ring-substituted sulfo derivative of the formula:

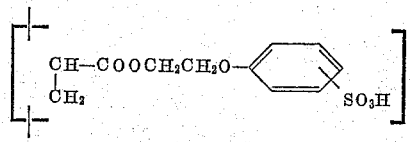

14. A paper product comprised of cellulosic papermaking fibers and including from about 2 to about 40 percent by weight based upon said fibers of a paper filler and from about 0.5 to about 10 percent by weight based upon said fibers of a normally solid, water soluble polymer consisting essentially of polymerized 2-phenoxyethyl acrylate and ethyl acrylate units in a proportion of from about 20 to about 80 percent by weight of each, and wherein at least about 50 percent of the total number of polymerized 2-phenoxyethyl acrylate units of said polymer are present as the ring-substituted sulfo derivative of the formula:

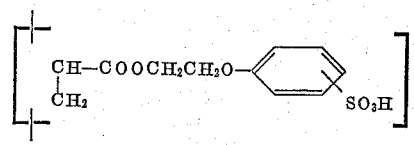

References Cited in the file of this patent
UNITED STATES PATENTS

| | | |
|---|---|---|
| 2,406,453 | Charlton et al. | Aug. 27, 1946 |
| 2,451,177 | Semegen | Oct. 12, 1948 |
| 2,765,229 | McLaughlin | Oct. 2, 1956 |
| 2,914,499 | Sheetz | Nov. 24, 1959 |
| 2,999,038 | Drennen et al. | Sept. 5, 1961 |

UNITED STATES PATENT OFFICE
CERTIFICATE OF CORRECTION

Patent No. 3,159,529                                        December 1, 1964

George W. Buttrick et al.

It is hereby certified that error appears in the above numbered patent requiring correction and that the said Letters Patent should read as corrected below.

Column 1, line 49, for "hard" read -- harsh --; column 3, line 48, for "peroxide" read -- peroxides --; column 10, line 16, for "and", second occurrence, read -- the --; column 12, line 24, for "at" read -- as --.

Signed and sealed this 20th day of April 1965.

(SEAL)
Attest:

ERNEST W. SWIDER                                      EDWARD J. BRENNER
Attesting Officer                                          Commissioner of Patents